P. Crary.
Curd-Breaker.
No. 73508. Patented Jan. 21, 1868.
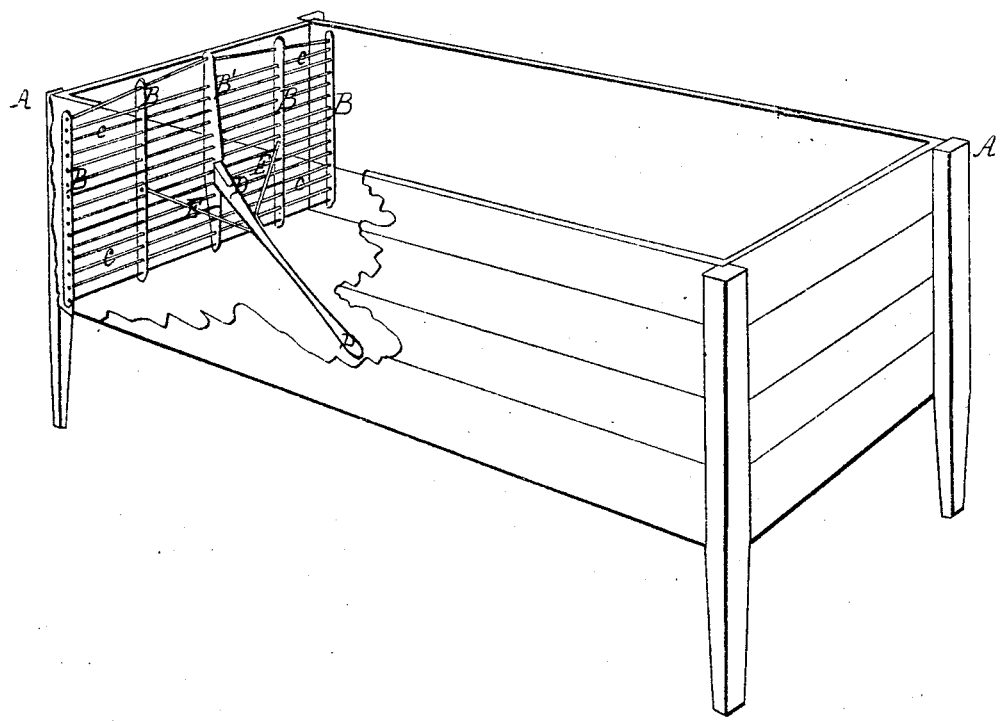
Witnesses
Charles P Crary
J Carroll House
Inventor
Palmyra Crary

United States Patent Office.

PALMYRA CRARY, OF LOWVILLE, NEW YORK.

Letters Patent No. 73,508, dated January 21, 1868.

---

IMPROVEMENT IN CURD-BREAKERS.

---

*The Schedule referred to in these Letters Patent and making part of the same.*

---

TO ALL WHOM IT MAY CONCERN:

Be it known that I, PALMYRA CRARY, of the town of Lowville, in the county of Lewis, and State of New York, have invented a new and useful implement for use in the manufacture of cheese, which I term a Curd-Breaker; and I do declare that the following is a full, clear, and exact description of the construction and operation of the same, reference being had to the accompanying drawing, making part of this specification, in which—

A A are designed to represent the vat in which the cheese is in the process of being made, and in which is the implement I claim as my invention, and which is constructed of the vertical wooden (or metallic) strips B B B B, in length corresponding to the depth of the vat, through which pass the parallel horizontal wires C C C C, which are secured at each end to the outside vertical bars B B. The length of these parallel wires is such that the frame thus formed, in conjunction with the vertical bars B B, shall nearly occupy the space formed by a vertical section of the vat, yet moving freely lengthwise through the mixed curd and whey. To the middle of the central strip, purposely made heavier than the others, is attached the handle D D. This handle is set at an angle to the plane of the frame, so that it can readily be grasped and operated by a person at the side of the vat. The handle is strengthened in its attachment to the frame by the diagonal braces E E, connecting with the vertical strips next adjoining the central one on either side.

Operation and Use.

Having thus described the construction, my method of its use is as follows: Soon after the separation of the caseine from the other constituents of the milk by the action of the rennet, and when the curd-cutter has been drawn lengthwise and crosswise through the same, by which act the curd is left in vertical square formations, I introduce the implement above described carefully at one end of the vat, and slowly move it by the handle D D lengthwise through the curd from end to end of the vat. By so doing, the wires C C cut or sever the square vertical columns of curd into cubes, and by the constant motion of my breaker, continued during the scalding of the curd, I am enabled to thoroughly pulverize and work the curd, avoiding very much of the white whey so detrimental to the quality of a fine cheese, and also relieving the maker from much of the handling of the curd.

Having thus described the construction and use of my invention, what I claim, and desire to secure by Letters Patent, is—

The implement so constructed and described as herein set forth.

PALMYRA CRARY.

Witnesses:
CHARLES P. CRARY,
J. CARROLL HOUSE.